United States Patent [19]

Rapolla

[11] 4,284,359

[45] Aug. 18, 1981

[54] AGGLOMERIZATION SYSTEM FOR INTERMIXING EDIBLE INGREDIENTS

[76] Inventor: Theodore Rapolla, 7630 N. Glenoaks, Burbank, Calif. 91504

[21] Appl. No.: 122,507

[22] Filed: Feb. 19, 1980

[51] Int. Cl.³ .......................... B01F 3/06; A23L 1/00
[52] U.S. Cl. .................................. 366/107; 99/475; 99/477; 99/483; 99/516; 118/24; 366/181; 366/186
[58] Field of Search ............... 366/101, 106, 107, 177, 366/181, 186; 99/475, 477, 483, 516; 426/285, 453; 118/24

[56] References Cited

U.S. PATENT DOCUMENTS

| | | | |
|---|---|---|---|
| 3,220,118 | 11/1965 | Isch-Wall et al. | 366/107 X |
| 3,331,306 | 7/1967 | Hutton et al. | 99/475 |
| 3,527,647 | 9/1970 | Hager | 99/483 X |
| 3,695,165 | 10/1972 | Sienkiewicz et al. | 99/475 X |
| 3,740,232 | 6/1973 | Purves et al. | 426/453 |

FOREIGN PATENT DOCUMENTS 1492837  9/1969  Fed. Rep. of Germany ............ 118/24

Primary Examiner—Philip R. Coe
Attorney, Agent, or Firm—Harvey C. Nienow

[57] ABSTRACT

An agglomerization system for intermixing edible ingredients comprising a chamber wherein various different edible ingredients are intermixed with steam, the latter of which is provided into the chamber through one or more manifolds. Such manifolds are horizontally disposed pipes having a plurality of openings for directing the steam in substantially the same direction as the edible dry ingredients are forced into the chamber from a hopper. A movable belt catches the fused ingredients to carry the product out of the agglomerization chamber.

9 Claims, 5 Drawing Figures

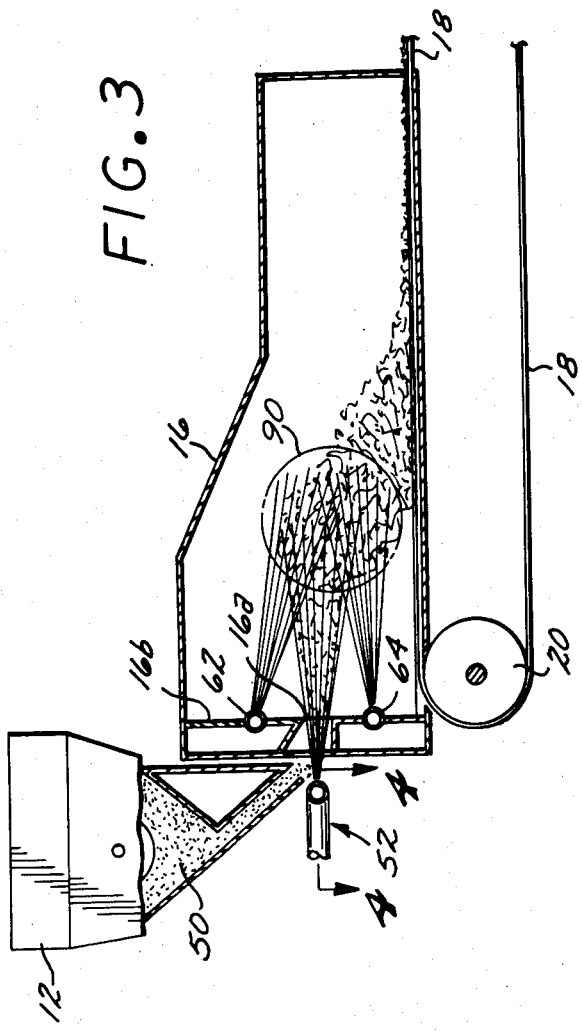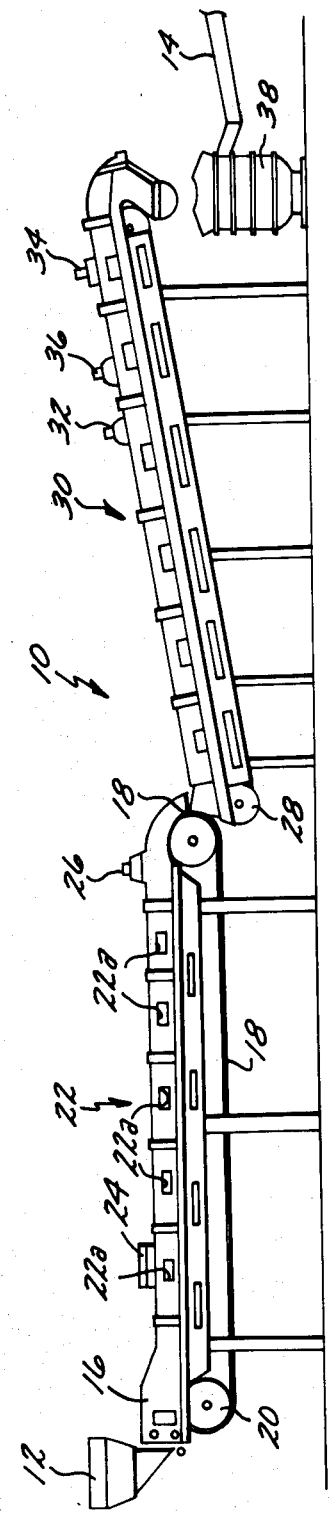

AGGLOMERIZATION SYSTEM FOR INTERMIXING EDIBLE INGREDIENTS

The present invention relates generally to agglomerization systems, but more particularly to such systems wherein edible ingredients are intermixed completely to provide a product which is substantially constant in that it does not vary throughout a relatively large batch.

Today, a shopper will find many different kinds of food products on the grocer's shelves, many of which are a combination of different ingredients. That is, today's shopper can find many different kinds of edible products which only a decade or two ago were available only as separate ingredients.

Thus, it is not necessary today to buy the various ingredients separately and then mix them together in certain proportions to provide the desired product. Rather, the shopper can purchase the end product with all of the various ingredients and flavorings already added, and thoroughly and completely intermixed.

The intermixing necessary to provide a consistent and desirable product is such that it must be complete so that the individual ingredients are no longer separately identifiable. Apparatus for accomplishing such intermixing has heretofore been available, but it has exhibited significant shortcomings such that the end product varied considerably with respect to consistency, flavor, compactness and the like.

It is an object of the present invention to provide an agglomerization system for intermixing edible ingredients which is capable of providing thorough and complete intermixing of the ingredients throughout an entire batch.

Another object of the present invention is to provide an agglomerization system as characterized above wherein the resulting product has uniform solubility and the various ingredients of such product are caused to dissolve simultaneously and at a faster rate.

A further object of the present invention is to provide an agglomerization system as characterized above which comprises a chamber wherein the dry ingredients are thoroughly circulated and physically intermixed with steam which causes the dry ingredients to fuse together.

Another object of the present invention is to provide an agglomerization system as characterized above which simultaneously blows the dry ingredients into the agglomerization chamber while steam under pressure is directed into the chamber.

An even further object of the present invention is to provide an agglomerization system as characterized above wherein the steam is injected into the chamber through one or more steam manifolds on either side of the path of the dry ingredients as they are blown into the chamber.

A still further object of the present invention is to provide an agglomerization system as characterized above wherein the chamber is provided with a bottom wall which is movable for catching the fused ingredients and carrying them from the chamber.

An even still further object of the present invention is to provide an agglomerization system as characterized above which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 3 is a fragmentary sectional view taken substantially along line 3—3 of FIG. 2;

FIG. 5 is an elevational view of an entire system for providing the food product.

Like reference characters indicate corresponding parts throughout the several views of the drawings.

Figure 1:
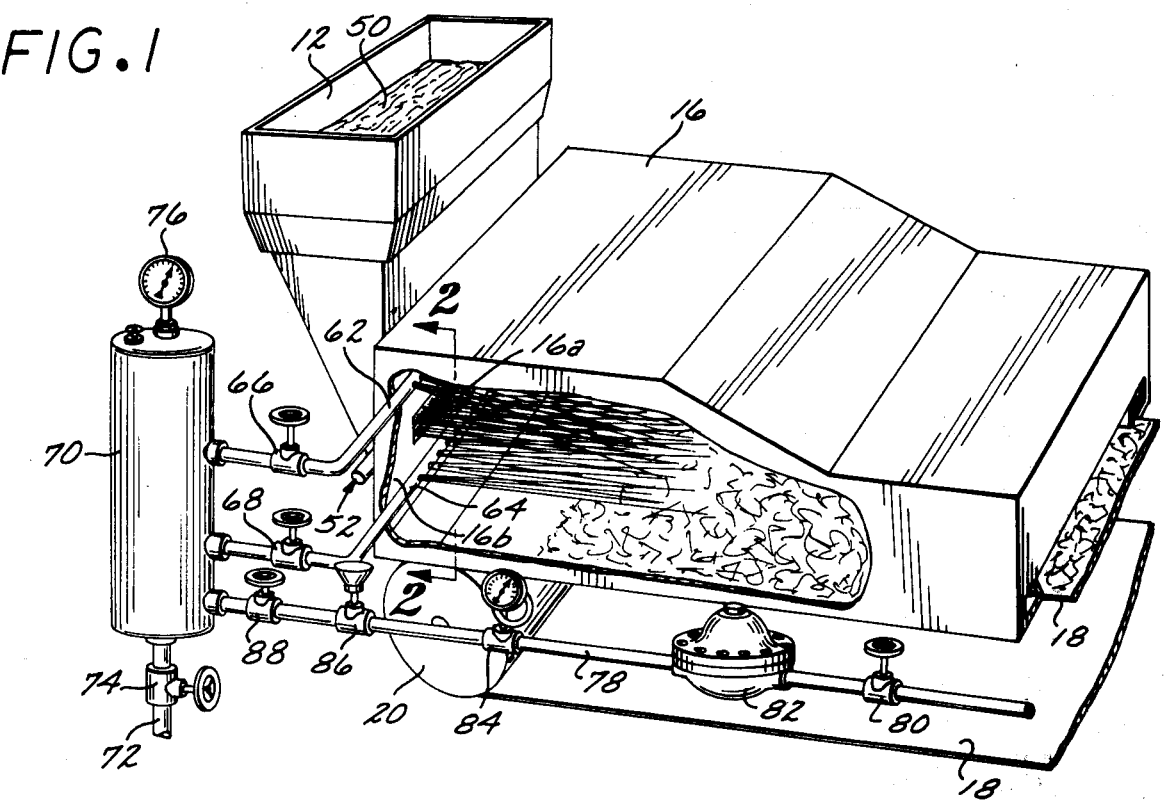
FIG. 1 is a fragmentary perspective view of a portion of the agglomerization system.

Referring to FIG. 5 of the drawings, there is shown therein a food product preparation line 10, which is afforded dry edible ingredients through a hopper 12 at one end of the line to provide a finished product on a conveyor belt 14 at the other end of the food preparation line 10.

From the hopper 12, the materials are intermixed in an agglomerization chamber 16, the construction and operation of which will be hereinafter more specifically described. Thereafter, the product is carried along an endless belt 18 which is driven by a pair of properly rotating rollers 20 through a heating chamber 22. The heating system is shown at 24, the system 22 being provided with access openings as shown at 22a. At the end of the heating chamber there is provided suitable exhaust means, as shown at 26, for allowing steam and other vapors to escape.

The food product is then transferred to another endless belt which is driven by suitable rotating pulleys or rollers, one of which is shown at 28, for transporting such product through a cooling chamber 30. Heat exhaust means is provided at 32 to allow removal of the heat which is accumulated from the heating chamber 22.

To effectively cool the product within chamber 30, cold air is brought into the chamber through an inlet fitting 34, and such cold air is exhausted through another fitting 36. Thus, the product is effectively cooled to the proper temperature, at the same time, causing the moisture content of the product to be stabilized within a predetermined range.

The product is ultimately moved from chamber 30 to a separator 38 where acceptable product is removed onto the conveyor belt 14 while the unacceptable material remains in the separator.

The entire food preparation line 10, as shown in FIG. 5, might be on the order of 75 to 90 feet in length to insure that the product has sufficient time to properly cure by heating and cooling after it has been properly intermixed as will hereinafter be explained in greater detail.

Referring to FIG. 1 of the drawings, there is shown therein the agglomerization chamber 16 from food preparation line 10 hereinabove described. The hopper 12 is provided with a motor driven feed for feeding the dry ingredients 50 into the interior of chamber 16.

It should be borne in mind that the dry ingredients 50 are the result of suitable mechanical mixing of all of the dry ingredients necessary in following a certain prescribed formula or recipe. That is, the ingredients 50 are the result of the mechanical, physical intermixing of all of the dry ingredients which are to be fused together in the agglomerization chamber to provide the desired product.

Figure 4:
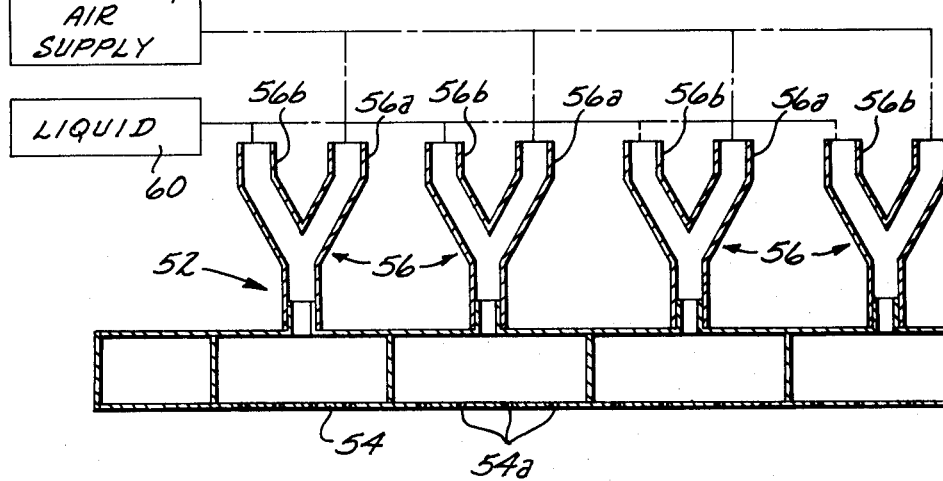
FIG. 4 is a sectional view through a manifold for feeding the dry ingredients into the system.

Mounted at the bottom of hopper 12 is a manifold 52 which, as shown in FIG. 4, comprises a horizontally disposed pipe 54 which is positioned outside the chamber 16 immediately adjacent an opening 16a in the rear wall 16b of chamber 16. Also included in the manifold is a plurality of Y-shaped inlet members 56, each of which has an end portion 56a connected to a source of air pressure 58, and an end portion 56b for connection with a source of liquid flavoring 60, if the latter is desired.

The air supplied to the manifold 52 from air supply 58 causes the dry ingredients from hopper 12 to be forced into and swirled about within the agglomerization chamber 16, the motor driven feed of hopper 12 driving the dry ingredients to the opening 16a in chamber 16. Pipe 54 is provided with a plurality of small holes along its length, on the order of 1/32 inch in diameter and approximately ¼ inch apart. The air as well as the liquid flavoring is forced into the chamber through such openings 54 to effectively circulate the dry ingredients within the chamber.

Figure 2:
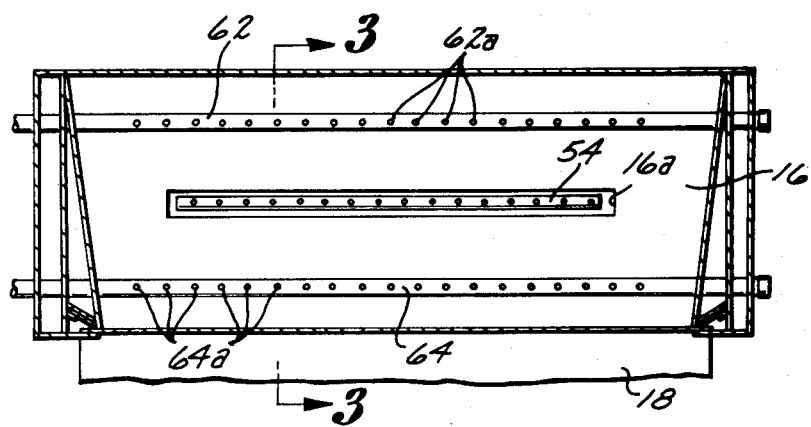
FIG. 2 is a fragmentary sectional view taken substantially along line 2—2 of FIG. 1 of the drawings.

Positioned immediately above manifold 52 in close proximity to wall 16b of chamber 16 is a steam pipe 62. In like fashion, another steam pipe 64 is positioned on the opposite side of manifold 52, namely, there beneath as shown in FIG. 2. Pipes 62 and 64 are connected through appropriate valves 66 and 68, respectively, to a tank of steam 70 wherein condensate is removed through a suitable drain pipe 72 and valve 74. A gauge 76 is provided on tank 70 for indicating the steam pressure. A steam inlet pipe 78 is connected to a suitable source of steam (not shown), and includes a valve 80, a pressure regulator 82, a pressure gauge 84, a temperature gauge 86 and a valve 88 to afford a supply of steam to tank 70. To properly sterilize the ingredients and the resulting product, the steam as applied to the chamber 16 should be at least 250 degrees Fahrenheit as read on the steam temperature gauge 86.

By suitable manipulation of the valves 66 and 68, steam is afforded to the pipes 62 and 64. Each of such pipes within the chamber 16 is provided with a series of holes as shown at 62a and 64a in FIG. 2 of the drawings. These holes are approximately 1/32 of an inch in diameter and are approximately ¼ inch apart. They are so positioned in the respective pipes as to cause the steam to be directed substantially horizontally, in substantially the same direction that the dry ingredients are forced into the chamber by the air pressure as above described.

FIG. 3 of the drawings shows the relationship between the steam pipes 62 and 64 and the inlet manifold 52 for the dry ingredients 50. The dry materials are thoroughly intermixed with the air and steam as well as with the liquid flavoring from source 60, substantially in the area identified with the broken line 90. The heat and moisture of the steam facilitates the thorough fushion of all of these materials into the desired product. Such fusion takes place within the circulating air within chamber 16, and ultimately the product falls under the force of gravity, onto the endless belt 18. From here the product is conducted through the curing apparatus as above described with respect to FIG. 5 of the drawing.

It is thus seen that the present invention provides an agglomerization system which utilizes steam under pressure within an agglomerization chamber to thereby cause the ultimate product to be extremely consistent and of high quality in that the intermixing and fusion of the various ingredients is complete and non-varying.

Although I have shown and described certain specific embodiments of my invention, I am well aware that many modifications thereof are possible. The invention is not to be restricted except insofar as is necessitated by the prior art and by the spirit of the appended claims.

I claim:

1. An agglomerization system for intermixing edible ingredients comprising in combination:
   means forming an agglomerization chamber having a movable bottom wall and provided with an end wall formed with an opening;
   a hopper for dry edible ingredients at said end wall of said chamber including a manifold for dispensing through said opening said ingredients into said chamber under pressure; and
   a steam system comprising a pair of steam discharge pipes on opposite sides of said opening and connected to a source of steam whereby said ingredients are intermixed within said agglomerization chamber with said steam.

2. An agglomerization system for intermixing edible ingredients according to claim 1,
   wherein said manifold is connected to a source of air under pressure to force said dry ingredients into said agglomerization chamber.

3. An agglomerization system for intermixing edible ingredients according to claim 2,
   wherein said manifold is provided with means for injecting liquid flavoring into said chamber with said dry ingredients.

4. An agglomerization system for intermixing edible ingredients according to claim 3,
   wherein the opening in said end wall of said chamber is elongated and disposed substantially horizontally therein and said manifold is elongated to fit within said elongated opening whereby the ingredients from said hopper are dispersed into said chamber across the width thereof.

5. An agglomerization system for intermixing edible ingredients according to claim 4,
   wherein each of said pair of steam discharge pipes is formed with a plurality of discharge openings to direct the steam substantially parallel to the direction said dry ingredients are dispensed into the agglomerization chamber.

6. An agglomerization system for intermixing edible ingredients according to claim 5,
   wherein said steam discharge pipes are disposed substantially horizontally in said chamber in close proximity to said end wall of said chamber, one of said pipes being above said manifold and the other being below said manifold.

7. An agglomerization system for intermixing edible ingredients according to claim 6,
   wherein the discharge openings in said steam pipes are approximately 1/32 inch in diameter and are approximately ¼ inch apart.

8. An agglomerization system for intermixing edible ingredients according to claim 7,
   wherein said agglomerization chamber is heated.

9. An agglomerization system for intermixing edible ingredients according to claim 8,
   wherein the movable bottom wall of said chamber is an endless belt for moving the agglomerized product from said chamber.

* * * * *